March 25, 1924.
G. R. STEVENSON
1,488,446
MACHINE FOR FORMING GEARS OR OTHER POLYGONAL ARTICLES
Filed May 6, 1921   9 Sheets-Sheet 1
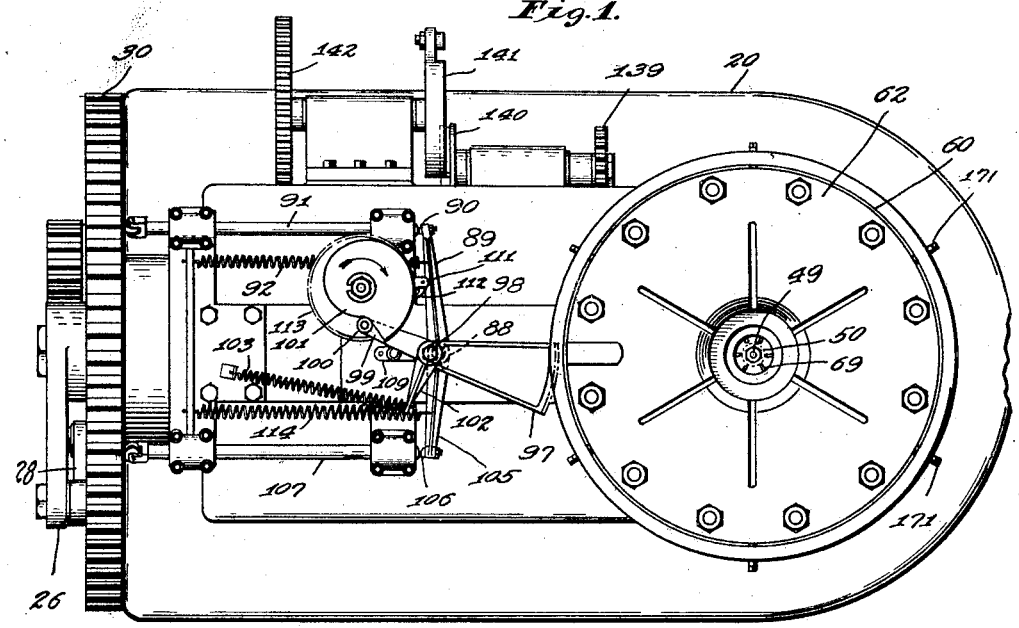
Inventor
George R. Stevenson,
By Hood & Schley
Attorneys March 25, 1924.

G. R. STEVENSON 1,488,446

MACHINE FOR FORMING GEARS OR OTHER POLYGONAL ARTICLES

Filed May 6, 1921    9 Sheets-Sheet 2

Inventor
George R. Stevenson,
BY Hood & Schley
Attorneys

March 25, 1924.

G. R. STEVENSON

MACHINE FOR FORMING GEARS OR OTHER POLYGONAL ARTICLES

Filed May 6, 1921

1,488,446

9 Sheets-Sheet 3

Inventor
George R. Stevenson,
By Hood & Seley
Attorneys

March 25, 1924.  
G. R. STEVENSON  
1,488,446  
MACHINE FOR FORMING GEARS OR OTHER POLYGONAL ARTICLES  
Filed May 6, 1921 9 Sheets-Sheet 4
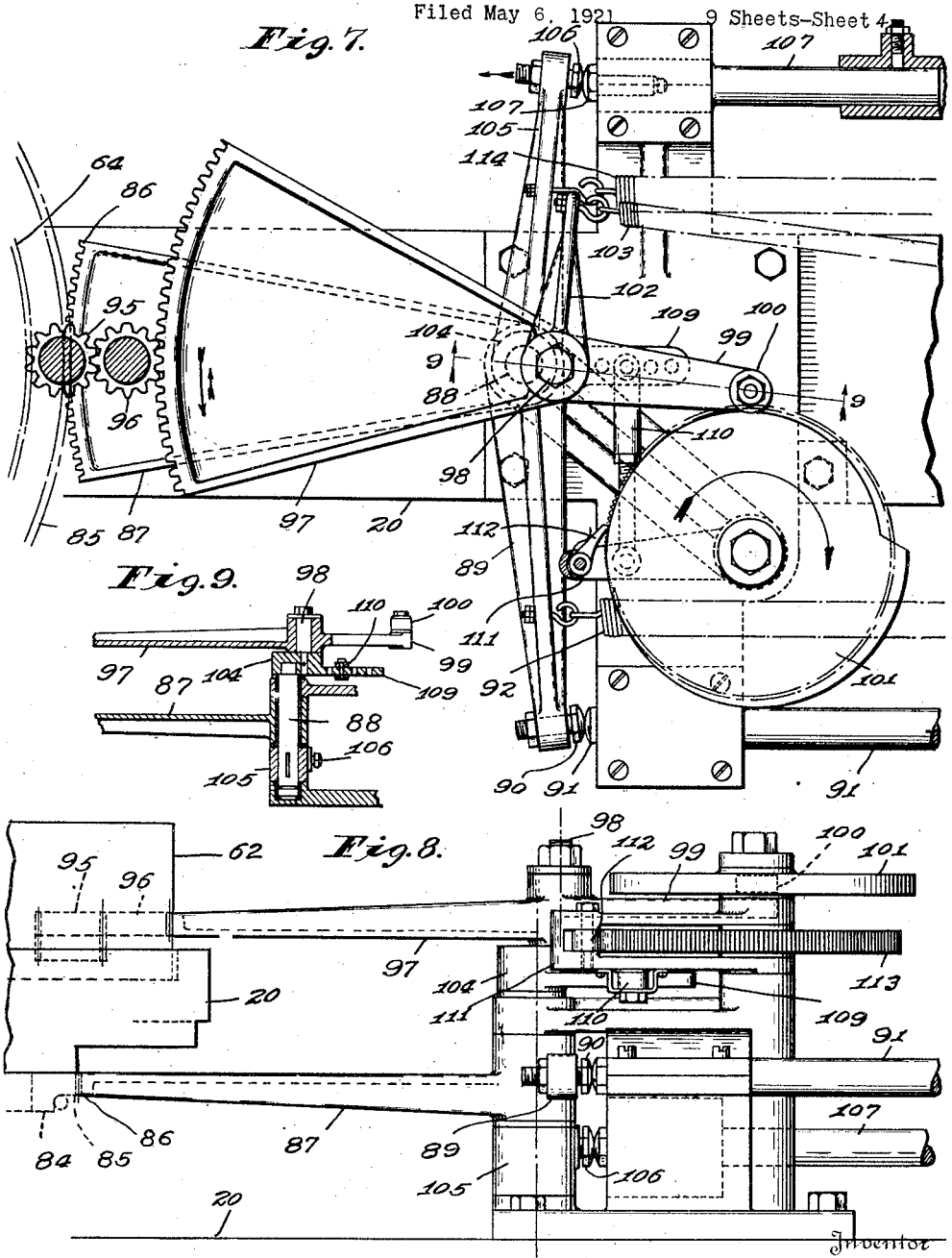
Inventor  
George R. Stevenson,  
By Hood & Schley  
Attorneys

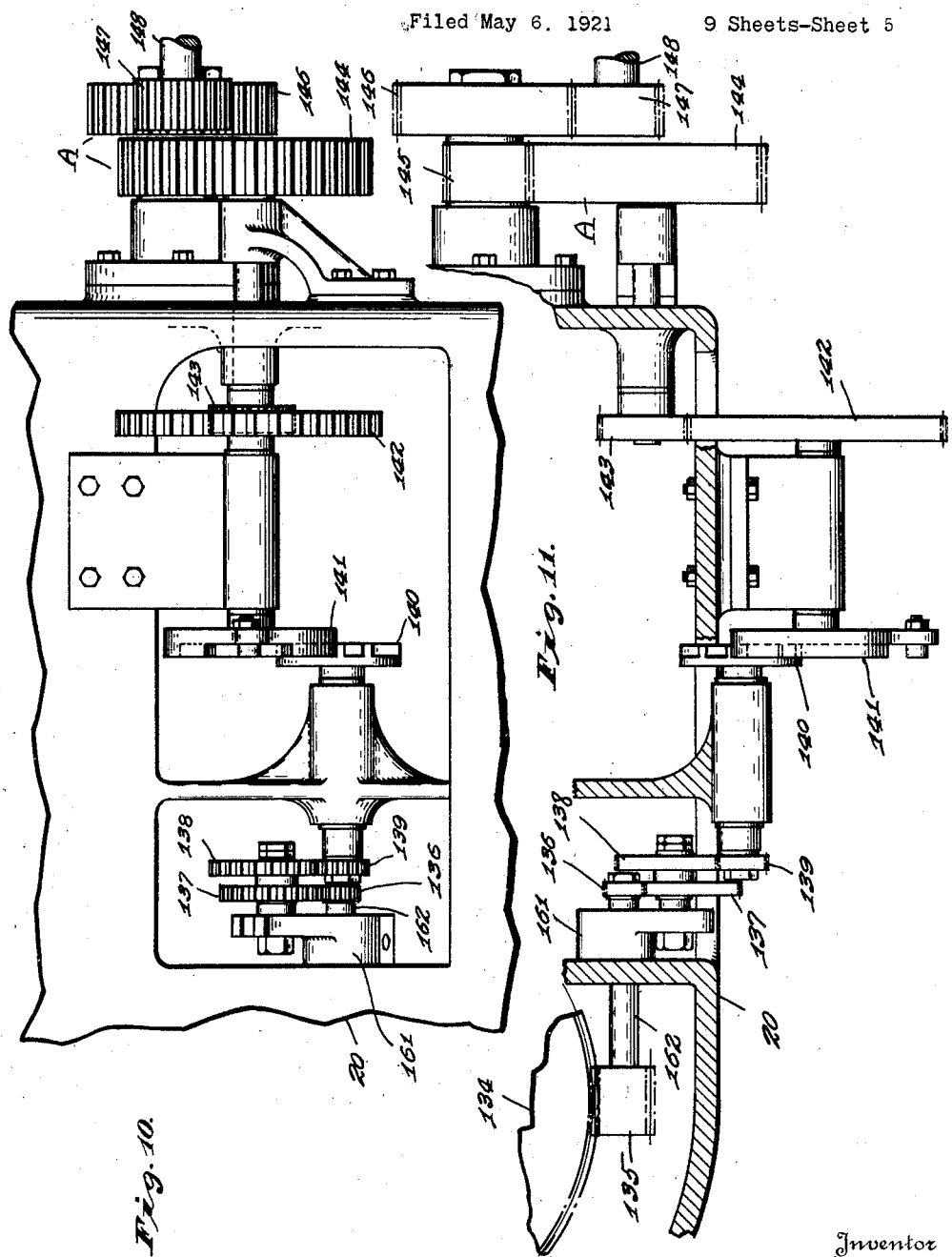

March 25, 1924.  
G. R. STEVENSON  
MACHINE FOR FORMING GEARS OR OTHER POLYGONAL ARTICLES  
Filed May 6, 1921  
1,488,446  
9 Sheets-Sheet 6

Inventor  
George R. Stevenson  
By Hood & Schley  
Attorneys

March 25, 1924.
G. R. STEVENSON
1,488,446
MACHINE FOR FORMING GEARS OR OTHER POLYGONAL ARTICLES
Filed May 6, 1921   9 Sheets-Sheet 7
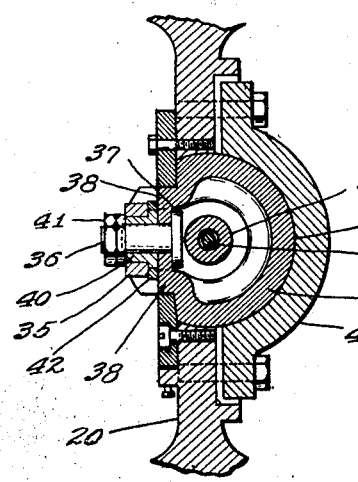
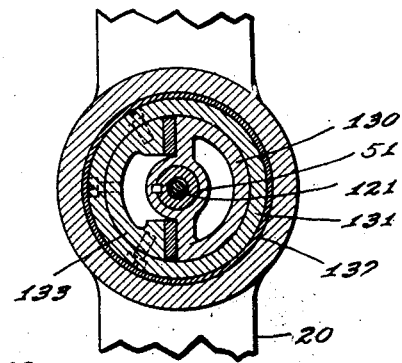
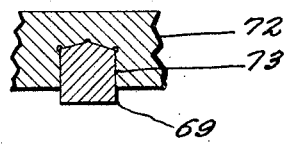
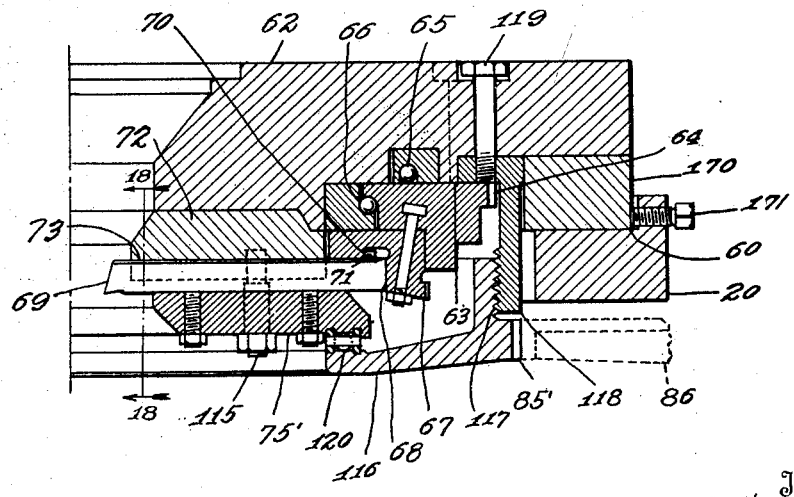
Inventor
George R. Stevenson,
By Hood & Schley
Attorneys

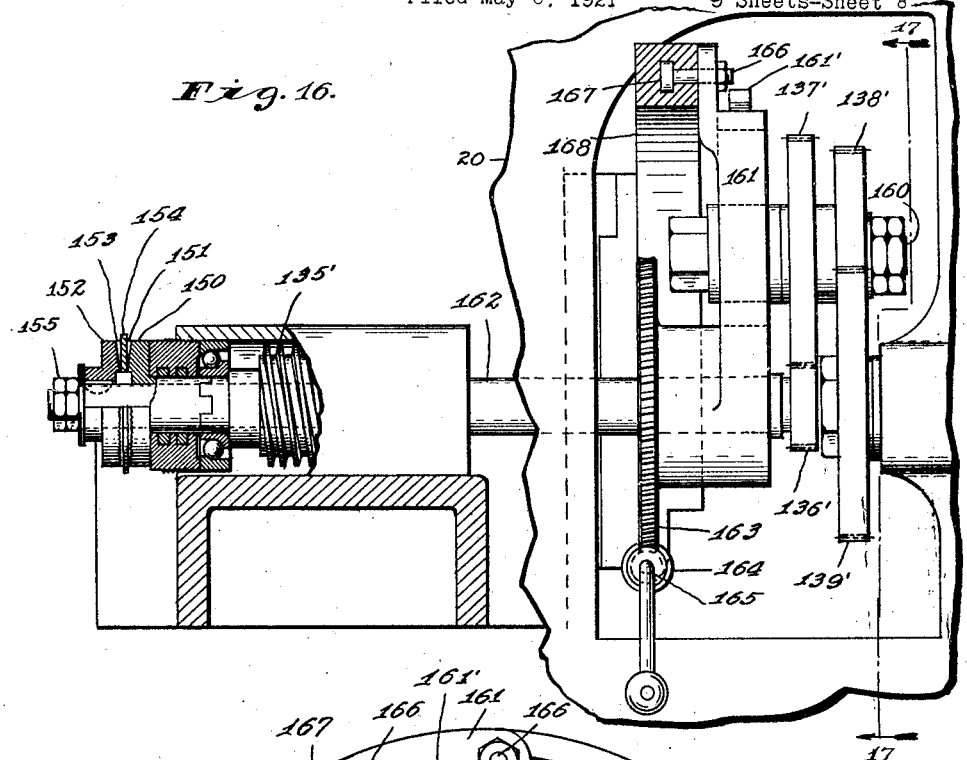
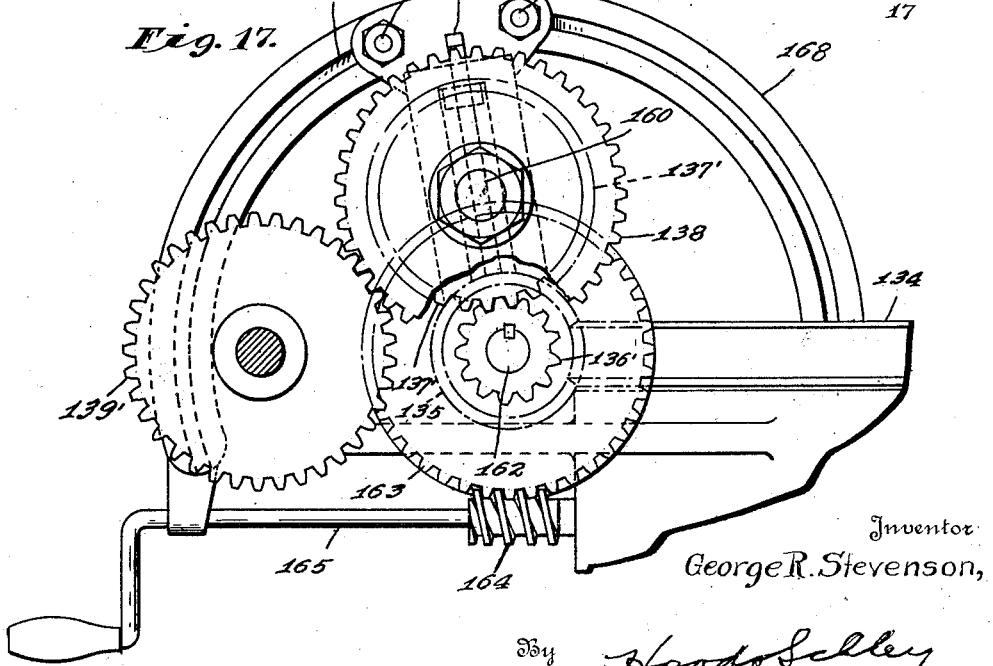

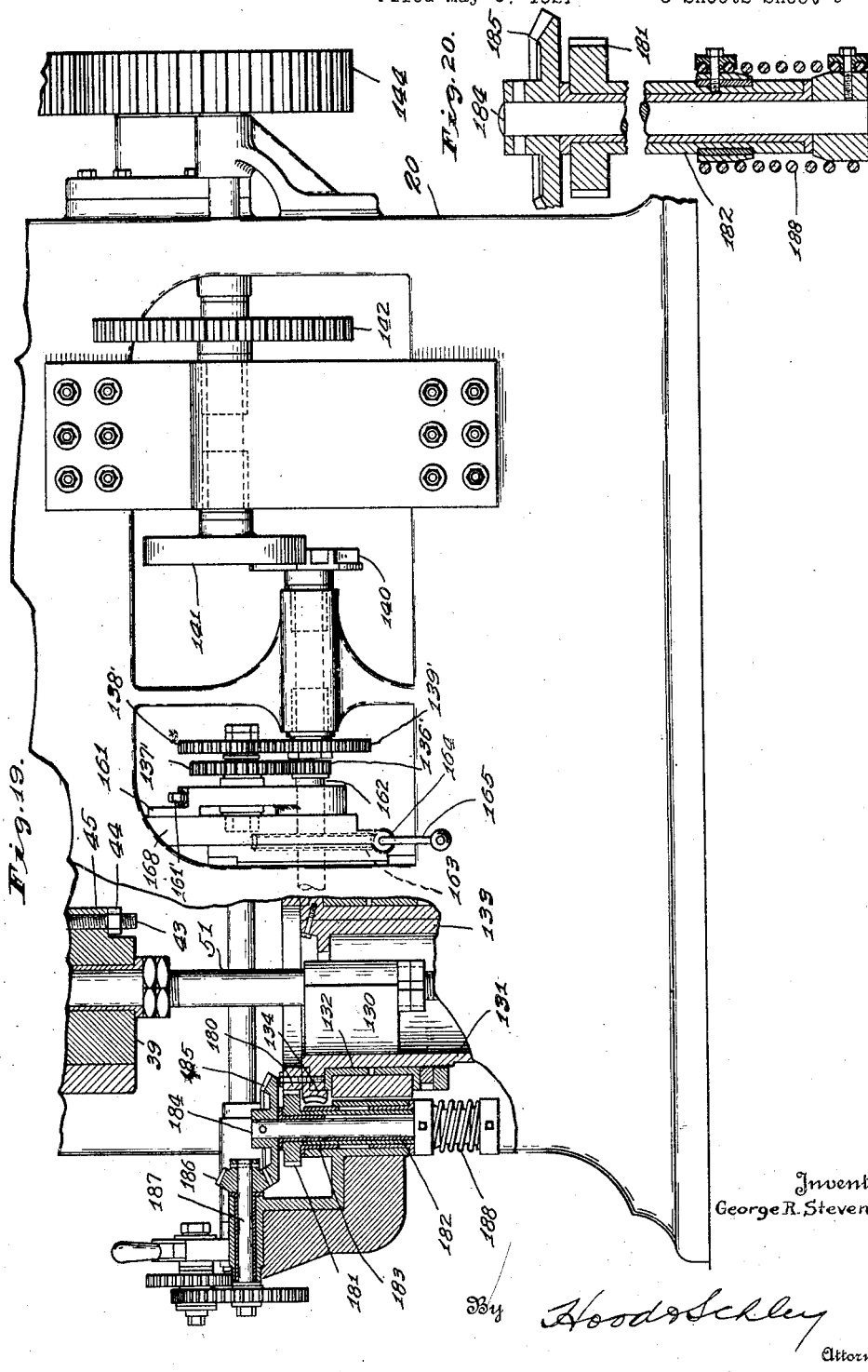

Patented Mar. 25, 1924.

1,488,446

UNITED STATES PATENT OFFICE.

GEORGE R. STEVENSON, OF INDIANAPOLIS, INDIANA, ASSIGNOR TO STEVENSON GEAR COMPANY, OF INDIANAPOLIS, INDIANA, A CORPORATION OF DELAWARE.

MACHINE FOR FORMING GEARS OR OTHER POLYGONAL ARTICLES.

Application filed May 6, 1921. Serial No. 467,503.

*To all whom it may concern:*

Be it known that I, GEORGE R. STEVENSON, a citizen of the United States, residing at Indianapolis, in the county of Marion and State of Indiana, have invented a new and useful Machine for Forming Gears or Other Polygonal Articles, of which the following in a specification.

The object of my invention is to produce a commercially practical machine by means of which articles of toothed or polygonal form may be rapidly and accurately formed by operations which will simultaneously act upon a plurality of circumferentially spaced portions of the blank.

Figures 4, 21:
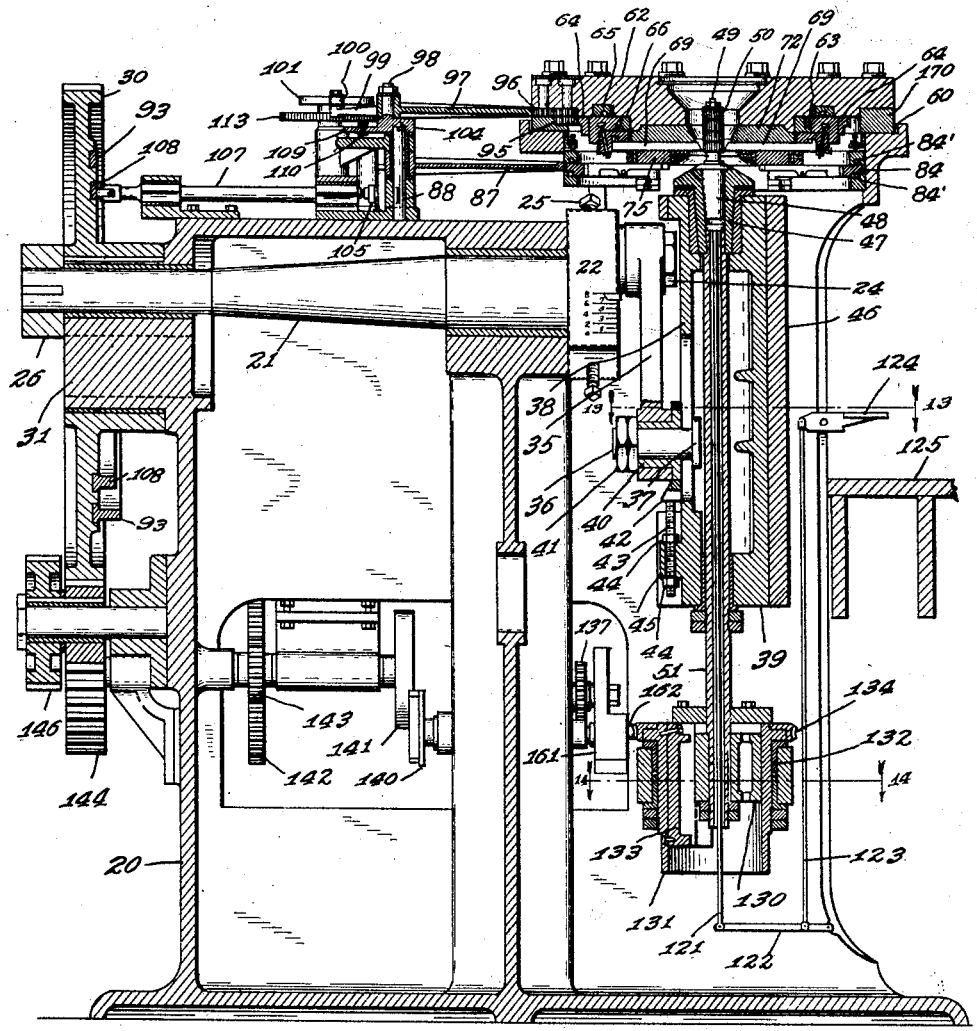
Figure 5:
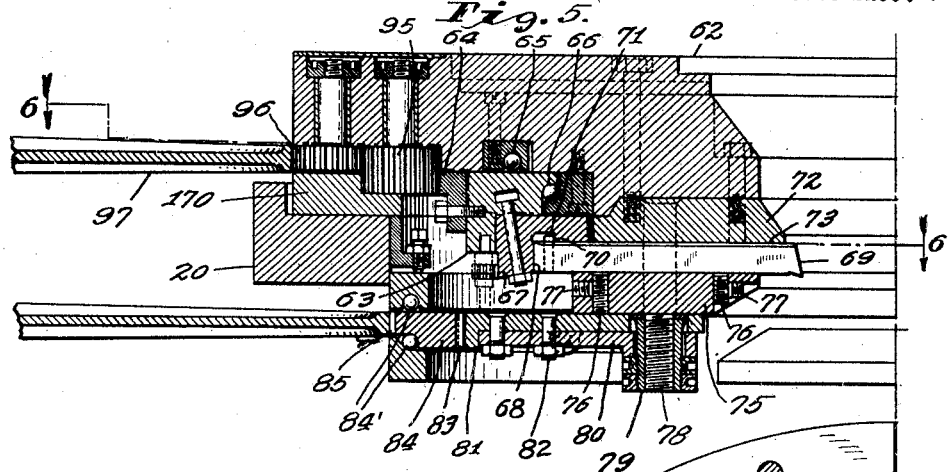
Figure 6:
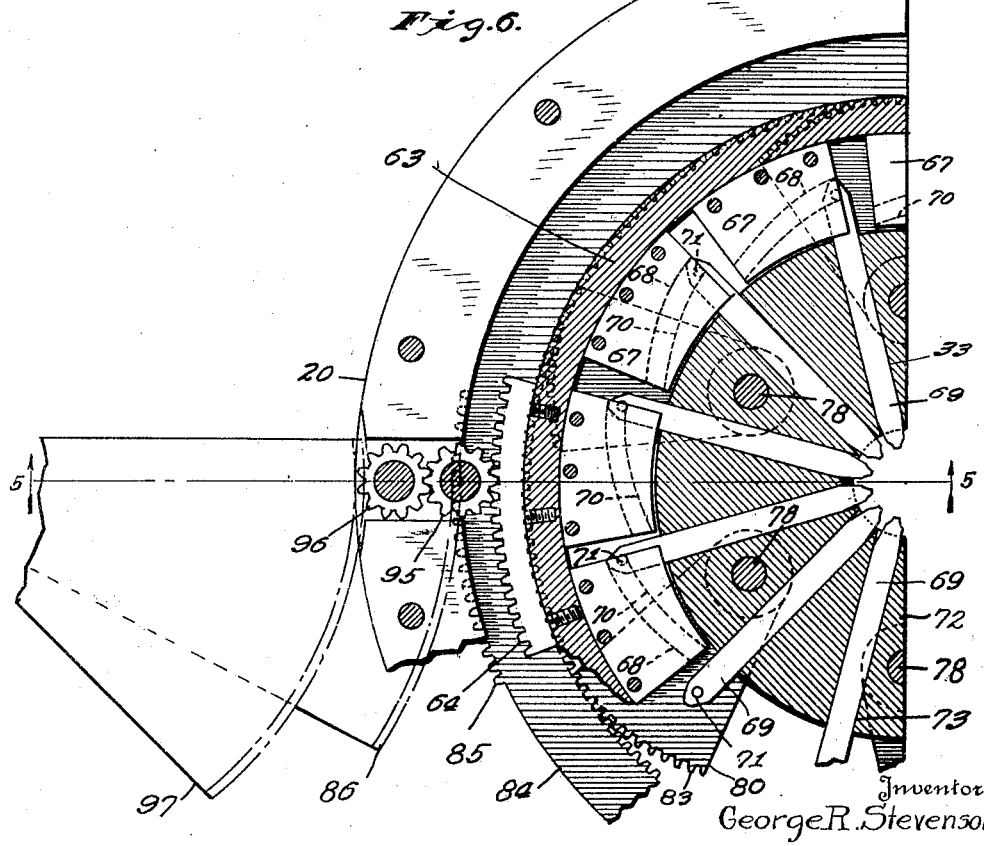
Figure 12:
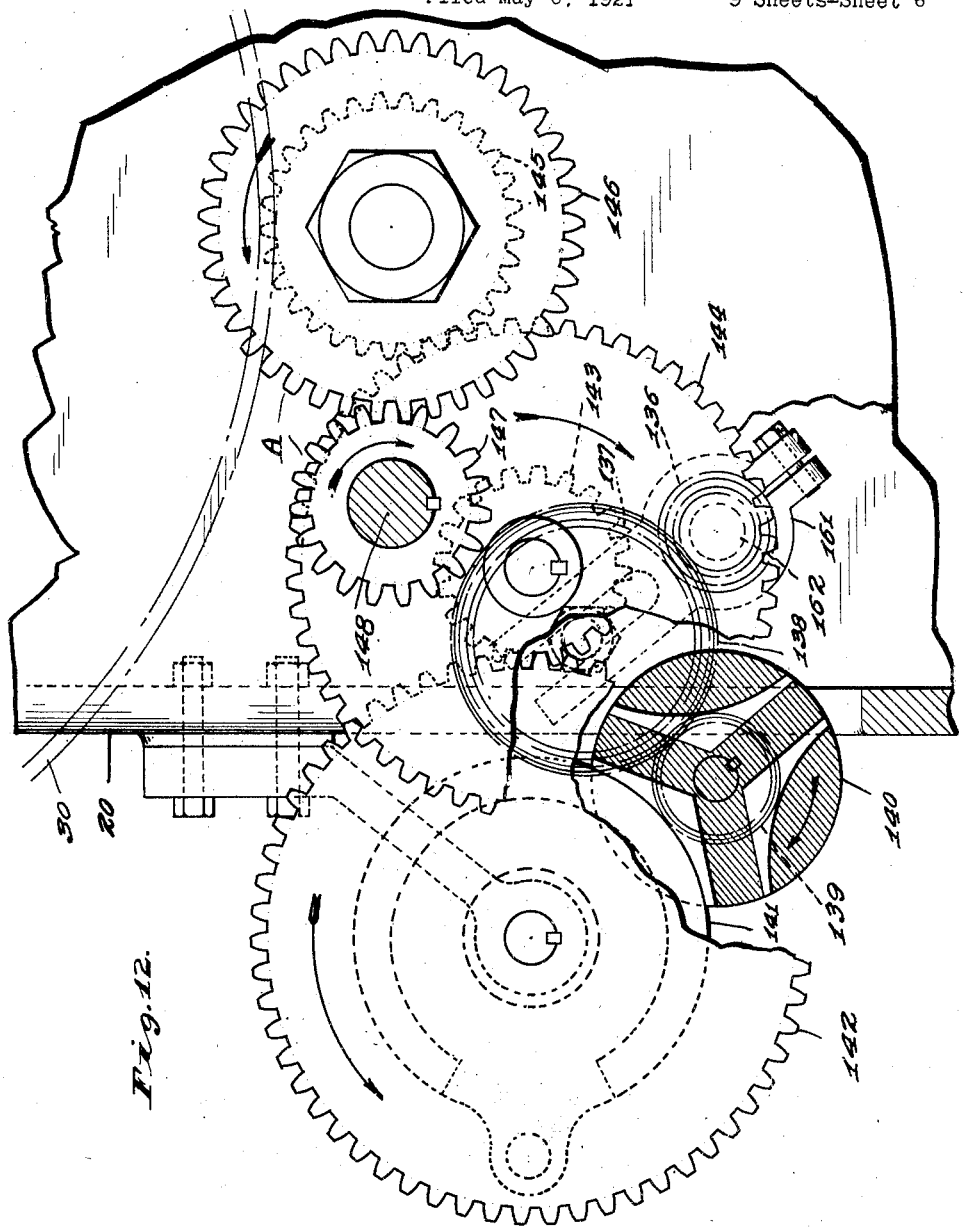

The accompanying drawings illustrate my invention embodied in a machine for spur gears, etc., although it will be readily understood that the use of the machine is by no means limited to this particular form. Fig. 1 is a plan of the machine; Fig. 2 an elevation; Fig. 3 a fragmentary elevation 180° from the plane of Fig. 2; Fig. 4 a central vertical section; Fig. 5 a vertical section on line 5—5 of Fig. 6; Fig. 6 a horizontal section on lines 6—6 of Fig. 5; Fig. 7 a plan of the cutter-controlling mechanism; Fig. 8 a side elevation of the parts shown in Fig. 7; Fig. 9 a fragmentary section on line 9—9 of Fig. 7; Fig. 10 a side elevation of the indexing gear; Fig. 11 a plan of the indexing gear shown in Fig. 10, adjacent portions of the main frame being shown in this section; Fig. 12 an end elevation in partial vertical section of the indexing gear; Fig. 13 a section on line 13—13 of Fig. 4; Fig. 14 a section on line 14—14 of Fig. 4; Fig. 15 a fragmentary vertical section of modified tool-holding-and-clamping parts; Fig. 16 a side elevation, in vertical section, of the change gears forming part of the indexing train; Fig. 17 a section on line 17—17 of Fig. 16; Fig. 18 a fragmentary section on line 18—18 of Fig. 15; Fig. 19 a fragmentary section, in partial elevation, of a "booster" mechanism forming part of the indexing train; Fig. 20 an enlarged detail of the "booster"; Fig. 21 a fragmentary detail of means for preventing chips from entering the ram guide.

In the drawings, 20 indicates the main frame of the machine in which is journalled a main shaft 21 provided at one end with a crank 22 having a radial slot 23 (dotted lines Fig. 2) in which is adjustably mounted a wrist pin 24, adjustment being obtained by a set-screw 25 of usual form. It being desirable that shaft 21 be driven more rapidly through one portion of its cycle than another, I secured to said shaft a crank arm 26 having a wrist pin 27 connected by a link 28 at 29 with a gear 30 journalled on stud 31 on frame 20 eccentric to the axis of shaft 21. Gear 30 is driven by means of the gear train A from a suitable motor.

Wrist pin 24 carries a pitman 35 pivoted upon the pin 36 which is provided at its inner end with a head 37 which takes in flanges 38 of the ram 39. Pin 36 carries a bushing 40 upon which the pitman 35 is journalled and the pin is clamped in place by the clamping nuts 41. Bushing 40 is carried by an adjusting head 42 which is provided with a threaded stem 43 adjustably held in place by nuts 44 which engage a projection 45 on the ram, the arrangement being such that the position of pin 36 relative to the ram 39 may be accurately adjusted for purposes which will appear.

The ram 39 (Fig. 13) is vertically reciprocable in bearing 46 on frame 20 and carries at its upper end a mandrel-receiving head 47 adapted to receive the tapered shank 48 of the mandrel 49 upon which one or more blanks 50 may be assembled.

The head 48 forms the upper end of a spindle 51 which is journalled in the ram 39.

At the upper end of frame 20 is formed a seat 60 concentric with the axis of spindle 51 and bolted in this seat is a cutter-carrying head 62 upon which is journalled a cam carrying ring 63 provided with external teeth 64, suitable ball-bearings 65 and 66 being provided for the cam carrying ring. Ring 63 is provided with a circumferential series of cams 67 having cam surfaces 68 against which the outer ends of the tools 69 abut. Each cam 67 is also provided with a retracting cam surface 70 contacted by a pin 71 carried by tool 69. Forming part of the cutter carrying head 62 is a ring 72 in which is formed a circumferential series of tool seats 73 which extend, in the present instance, accurately radially across ring 72, each seat being formed by a pair of converging surfaces (see Fig. 18) which receive and center the correspondingly shaped base of tool 69, the said tool at its active end being formed to produce the desired shape of cut.

In practice, I find that it is desirable to form the active ends of the tools some as roughing cutters and some as finishing cutters, preferably arranging these tools alternately.

Referring now particularly to Figures 4 and 5. The tools 69 are held in their seats by a clamping ring 75 which, opposite each tool, is preferably provided with threaded pressure pins 76 which, after adjustment, may be firmly held in place by lock screws 77. Extending through rings 72 and 75 are several bolts 78, the lower end of each of which is threaded and carries a clamping nut 79 adapted to bear against the clamping ring 75. Locked to each nut 79 is an arm 80 clamped to and angularly adjustable upon a segment 81 by bolts 82. Segment 81 pivots upon bolt 78 and is provided with teeth 83 (Fig. 6) which mesh with the internal teeth of a gear ring 84 journalled in bearings 84', 84' carried by frame 20.

Ring 84 is provided with external teeth 85 which mesh with a segment 86 carried by a lever 87 pivoted at 88 on the main frame. Lever 87 is provided with an arm 89 which at its outer end carries an adjustable pressure head 90 which is held against an operating plunger 91 by a spring 92, the plunger 91 being intermittently reciprocated by means of a cam 93 carried by gear 30, the arrangement being such that ring 84 is intermittently reciprocated and, through the medium of segments 81 and nuts 79, serves to intermittently release and tighten the clamping ring 75 relative to tool 69.

The tools 69 are intermittently gradually advanced toward the blank and, following each cutting action, are slightly retracted in order that the blank may be carried to initial position without dragging upon the tools. This movement is accomplished by a gradual advance of the cam ring 63 and by successive retractions of said ring. In order to accomplish this result, teeth 64 mesh with a pinion 95 journalled in head 62 and meshing with pinion 96 also journalled in head 62. Meshing with pinion 96 is a segment 97 pivoted upon a wrist pin 98 and provided with an arm 99 carrying a roller 100, which contacts with the feed cam 101. Segment 97 is also provided with an arm 102 engaged by a spring 103 which serves to hold roller 100 in contact with cam 101.

The wrist pin 98 is carried by a short crank arm 104 attached to the rock shaft 88, upon which arm 87 is freely pivoted. At the lower end of rock shaft 88, below arm 87 (Fig. 8) is an arm 105 which is secured to the rock shaft 88 and is provided at its outer end with a pressure head 106 engaged by a plunger 107 which is contacted by a cam 108 carried by gear 30. By this arrangement, it will be noted that advancement of cam 101, in the direction indicated by the arrow thereon in Fig. 7, will cause advancement of segment 97 in the direction indicated by the long arrow thereon, and that intermittent rocking of shaft 88, by reciprocation of arm 105 in the direction indicated by the arrow adjacent thereto, will shift wrist pin 98 (upwardly in Fig. 7) so that segment 97 will then fulcrum upon roller 100 and thus cause a reverse movement comparatively short in extent, which will cause reverse movements of pinions 96 and 95, and cam ring 63, thereby serving to slightly retract tools 69 through the medium of the cam surfaces 70 and 71. The amount of retraction of the tools, considering only the effect of the movement of wrist pin 98, is greater than necessary for tool clearance in order that the advance of the tool for the next cutting may be accomplished during the period of tool retraction. This is accomplished by providing lever 105 with an arm 109 to which, at various points in its length, may be connected a link 110 which is also connected to a pawl lever 111 carrying a pawl 112 and sleeved upon the shaft of cam 101, said shaft also carrying a ratchet wheel 113 with which the pawl 112 cooperates, the arrangement being such that, as the retractive movement of segment 97 is accomplished, the cam 101 is simultaneously advanced, thus advancing segment 97 about wrist pin 98 whereupon, as wrist pin 98 is caused to return to normal by spring 114 when plunger 107 is freed by cam 108, the wrist pin 98, acting upon segment 97 in a forwarding direction, will cause the segment 97 to fulcrum upon roller 100 and advance the cam ring 63 so as to bring the several tools 69 simultaneously to the new cutting position.

It will be noticed in connection with the mechanism for controlling the positions of tools, that the retracting movements are positive, while the advancing movements are produced by the several springs 92, 103 and 114.

In Fig. 15 I have shown a modification of means for clamping the tools, this modification eliminating the segments 81, the clamping nuts 79 and the associated parts. In this form the clamping ring 75' is loosely retained in place upon the base ring 72 by bolts 115. A clamping ring 116 is threaded at 117 into a ring 118 secured to head 62 by bolts 119 and ring 116 is provided with external teeth 85' which mesh with segment 86. A series of balls 120 is interposed between ring 116 and ring 75' so that the pressure of ring 116 is transmitted to the clamping ring 75' through the medium of the balls, thus reducing to a sufficient extent the possibility of any sticking between the two rings. In this arrangement the oscillation of ring 116, owing to threads 117, will alternately release and tighten ring 75′ with relation to the tools 69.

The cutting is accomplished during the up-stroke of the ram 39 so that the tapered shank 48 of the mandrel is constantly being forced to its seat. In order to remove the mandrel from head 47, I provide an ejector 121, which extends up through spindle 51 so as to be capable of engaging shank 48. This ejector 121 is carried by lever 122 which is connected by a link 123 with foot lever 124 placed in a convenient position upon frame 20 for operation from the floor level 125.

In the practical production of cutting tools for this machine it is not commercially practical to produce a multiplicity of tools which are absolutely identical. That is to say, each tool will have some minute characteristic which differs from its companions. It will be evident, however, that if means is provided for constantly intermittently rotating blanks as the work progresses, each tool will act in a regular cycle upon each successive portion of the blank and that consequently, the blank being given one complete turn at the end of the productive operation, each tool will impress upon the finished produce its own characteristic. I, therefore, provide means for intermittently advancing the blank as the work progresses and by this means I am able to produce a finished product having a very high degreee of accuracy.

At the lower end of spindle 51, I secure a semicylindrical-cross-head 130 which is axially slidable in a cylindrical sleeve 131 journalled in a bearing 132 in the main frame. Secured within the cylindrical sleeve 131 is a segmental guide 133 which complements the segmental cross-head 130 so that the cross-head 130 is free to be reciprocated with the ram 39 while at the same time being capable of being rotated around the axis of the ram by rotation of the sleeve 131. Secured to sleeve 131 is a worm-wheel 134 which is driven by a worm 135 (Fig. 11). Worm 135 is driven through the medium of a change speed gear train 136, 137, 138 and 139 by means of a Geneva gear pair 140, 141 of ordinary type, which, in turn, is driven through a suitable gear train 142, 143, 144, 145, 146 and 147 from the motor shaft 148.

Where it is desired to cut a compound gear in which the teeth of one portion must bear an accurate relation to the teeth of another portion, angularly, it is necessary to provide means for accurately angularly setting the blank relative to the forming tools after the teeth on the first element of the blank have been produced. For this purpose the spindle head and mandrel will have interlocking portions properly determining their relative positions, angularly, both as to each other and as to the forming tools. The spindle must then be accurately positioned, angularly, with relation to the forming tools, and for this purpose, I provide the mechanism shown in Fig. 16 at the left hand end. Here, the worm 135′, which corresponds to the worm 135 of other figures in the drawings, is loosely sleeved upon its shaft instead of being directly keyed to it, and is connected to a flange 150 provided with an annular series of teeth 151. Splined upon the shaft is a flange 152 provided with an annular series of teeth 153 facing teeth 151 and being either greater or less in number than teeth 151, the difference being preferably but one tooth. Between these two sets of teeth 151 and 153 is a correspondingly toothed locking plate 154 which is journalled upon the shaft. Flange 152 and plate 154 may be clamped against flange 150 by means of nuts 155. When it is desired to secure accurate angular adjustments of spindle 51, nuts 155 are loosened and flange 152 retracted just enough to permit plate 154 to be turned. This plate may then be turned an angular distance equal to one tooth of element 152, or more if desired, and the parts reclamped in place. It will, of course, be understood that for major adjustments plate 154 would be retracted from flange 150 whereupon this flange may be rotated, thereby rotating the worm 135 to any desired extent so as to closely approximate the desired position of the spindle 51.

In Figs. 16 and 17 I also show a slightly modified form of speed changing gear train comprising gears 139′, 138′, 137′ and 136′, these gears corresponding with the gears 139, 138, 137 and 136 respectively of the train shown in Fig. 11. The gears 137′, 138′ are change gears and are carried by a stud shaft 160 mounted to slide in a slotted arm 161 which is pivoted upon the shaft 162 (upon which the worm 135′ is sleeved) and is adjustable along said arm by means of a screw 161′. Secured to arm 161 is a worm-wheel 163 which meshes with an adjusting worm 164 carried by crank shaft 165. The outer end of arm 161 is provided with clamping bolts 166 which traverse an arc shaped T-slot 167 in the guide 168.

In order to accurately set the head 62 concentric with spindle 51 it is carefully fitted to the inner cylindrical surface of a ring 170 which is alined in the pocket 60 by means of temper screws 171 by means of which the ring 170 may be accurately centralized relative to the spindle 51.

Under some conditions the amount of power which must be delivered through the "Geneva gear," or other intermittent gearing, is greater than can be practically delivered through such mechanism and I have, therefore, provided what I term a "booster" mechanism, which will be available in the train at a point beyond the "Geneva gear,"

whenever said gear is released and started in a forwarding movement. This mechanism is illustrated in Fig. 19. In this construction, the worm-wheel 134 has attached to it a spur gear 180 which meshes with a spur gear 181 carried by a sleeve 182, journalled in bearing 183 on the main frame. Journalled in sleeve 182 is a shaft 184 which carries a gear 185 meshing with gear 186 carried by a constantly driven shaft 187 connected through any suitable train of gearing to a constantly moving shaft of the machine. Sleeve 182 and shaft 184 are connected by a spring 188 which permits relative rotative movement. During those periods when the "Geneva gear," or its equivalent, is holding gear 134 in a desired angular position, shaft 184 is nevertheless constantly rotating and storing up energy in the spring 188 so that, the moment the "Geneva gear," or its equivalent, is released and started forward, the supplemental power which has been stored within spring 188 immediately becomes available, acting through gearing 181 and 180, to assist in starting and forwarding the spindle 51. It will be readily understood that the parts just described may be so co-related that the energy of the spring 188, tending to forward gear 181, may be entirely expended either just as the parts to be forwarded have reached their ultimate position or, indeed, slightly before that time, so that the parts to be forwarded will not be brought too suddenly to the desired new position.

It will, of course, also be understood that the movement of shaft 187 must be properly proportioned so that the amount of force stored up in spring 188 during each period of rest of gear 134 will be utilized during the subsequent period of forward movement of gear 134. Stated in another way, it will be apparent that the movement of shaft 187 shall be such that if it were acting constantly upon spindle 51, it would move said spindle through a desired arc of indexing in the same time that said spindle is moved from one position to another through the intermittent gearing.

It is desirable, although not absolutely necessary, to prevent chips from entering the upper end of the ram guide, and in order to accomplish this result, I have provided the structure shown in Fig. 21. Secured to the upper end of the ram is a sheet metal housing 190 to the upper end of which is riveted the inner edge of a conical annulus or boot 191 of fabric or other flexible material, a supplemental sheet metal housing 192 having a vertical annular flange 193, being also riveted to the upper end of housing 190 on top of the fabric 191. The outer edge of the fabric 191 is secured to the upper end of the ram guide 46. Secured to spindle 51 and rotating with it is a ring 194 having a groove in its under face receiving flange 193 and carrying a felt packing ring 195, which engages and rotates upon the flange 193. At one side the boot 191 is supplemented by a semi-annular pan 196 which completely covers the subjacent mechanism and is preferably so formed that the chips which might accumulate thereon will be washed therefrom and delivered through a suitable spout by the oil or other cutting liquid which is used during the operation of the machine.

I claim as my invention:

1. The combination with a work holder, a cutting tool, means for causing relative cutting movement between the cutting tool and work holder, and means for varying the position of the tool relative to the work holder to cause successive cutting operation, of clamping means co-related with the cutting tool, and means, synchronized with the means for causing relative cutting movement, to alternately move the clamping means toward and from the cutting tool.

2. The combination with a work holder, a cutting tool, means for causing relative cutting movement between the cutting tool and work holder, means for intermittently angularly varying the relation between the cutting tool and work holder, and means for varying the position of the tool relative to the work holder to cause successive cutting operations, of clamping means co-related with the cutting tool, and means, synchronized with the means for causing relative cutting movement, to alternately move the clamping means toward and from the cutting tool.

3. The combination with a tool holder, of a tool mounted in said holder and movable toward and from the cutting position, means for moving said tool in said holder, clamping means associated with said holder and tool, and means synchronized with the tool moving means for alternately clamping and releasing said clamping means.

4. The combination with a work holding means, of a cutting tool, means for moving said cutting tool toward and from the work holding means, clamping means associated with said tool, and means for alternately clamping said tool in place and releasing said tool to permit movement thereof toward or from the work holder.

5. The combination with a work holding means, of a cutting tool, means for moving said cutting tool toward and from the work holding means for successive cuts, clamping means associated with said tool, and means for alternately clamping said tool in place and releasing said tool to permit movement thereof toward or from the work holder.

6. The combination with an annular tool-holding head provided with a series of tool seats, of a series of movably mounted tools in said seats, a clamping ring carried by said head and adapted to engage the tools, means for shifting said tools in their seats, and means for alternately clamping and releasing the clamping ring relative to the tools.

7. The combination with an annular tool-holding head provided with a series of tool seats, of a series of movably mounted tools in said seats, a clamping ring carried by said head and adapted to engage the tools, means for shifting said tools in their seats, and means for alternately clamping and releasing the clamping ring relative to the tools, said means comprising a threaded ring engaging the clamping ring.

8. The combination with a tool holding guide, of a tool movably mounted therein, reciprocable means operating upon said tool to shift the same in its holder, means for gradually advancing said tool, shifting means and other means for successively advancing and regressing said tool-shifting means.

9. The combination with a tool support and guide, of a tool movably mounted thereon, reciprocable means operating upon said tool to shift the same upon its guide, means for gradually advancing said tool shifting means, other means for successively advancing and regressing said tool shifting means, and clamping means associated with said tool, and means synchronized with the tool shifting means for alternately clamping and releasing said clamping means.

10. The combination with an annular tool holder provided with a plurality of tool seats, of a plurality of tools mounted in said seats, a rotatable member associated with the tool holder and engaging the tools to shift the same in their seats, means for advancing said rotatable member, and other means for alternately advancing and regressing said rotatable member.

11. The combination with an annular tool holder provided with a plurality of tool seats, of a plurality of tools mounted in said seats, a rotatable member associated with the tool holder and engaging the tools to shift the same in their seats, means for advancing said rotatable member, and other means for alternately advancing and regressing said rotatable member, said last mentioned means acting upon the first mentioned means.

12. The combination with a tool holding guide and a tool mounted therein, of means for clamping said tool in said guide and means for successively loosening the clamping means shifting the tool relatively to the guide and tightening the clamping means.

13. The combination of an annular tool carrying head provided with a series of tool seats, a series of tools movably mounted in said seats, a rotatable cam ring acting upon the tools to position the same in their seats, means for shifting said cam ring, said means comprising a segment, a movable fulcrum for said segment, and means for swinging said segment upon its fulcrum.

14. The combination of an annular tool carrying head provided with a series of tool seats, a series of tools movably mounted in said seats, a rotatable cam ring acting upon the tools to position the same in their seats, means for shifting said cam ring, said means comprising a segment, a movable fulcrum for said segment, means for swinging said segment upon its fulcrum, a clamping ring associated with said tools, and means for alternately releasing and clamping said clamping member relative to the tools.

15. The combination of an annular tool head provided with a series of tool seats, a series of tools movably mounted therein, a cam ring engaging said tools to position the same in their seats, a segment engaging said cam ring, a cam acting upon said segment to swing it upon its axis, a movable fulcrum for said segment, a clamping ring acting upon said tools, an oscillating member acting upon said clamping ring to alternately clamp and release the same, a segment engaging said clamping ring and carrying the fulcrum for the first mentioned segment, and means for alternately reciprocating said second segment.

16. The combination of a work holder, an annular series of cutting tools arranged around the axis of the work holder, means for causing relative movement axially between the work holder and tools, means synchronized with said last mentioned means for automatically successively advancing the angular relation between the tools and work holder, to successively bring each tool into successive working positions relative to the work whereby the individual characteristics of each tool are successively impressed upon the work, and means for feeding the tools toward the work.

17. The combination with an element to be advanced step by step, of means for causing said step by step advancement, said means comprising an interlocking intermittent gearing alternately releasing and locking said first mentioned element and a booster drive acting upon the first mentioned element but effectively locked as to said first mentioned element when the said element is locked by the intermittent gearing, said booster mechanism comprising a storage spring and means for energizing the said spring during the period when said first mentioned element is locked.

18. The combination with an element to be advanced step by step, of means for causing said step by step advancement, said means comprising an interlocking intermittent gearing alternately forwarding and locking said first mentioned element, and a booster drive acting upon the first mentioned element but effectively locked as to said first mentioned element when the said element is locked by the intermittent gearing, said booster mechanism comprising a storage spring and means for energizing the said spring during the period when said first mentioned element is locked.

19. The combination with an element to be advanced step by step of means for causing said step by step advance including a rotatable shaft, a gear by which said shaft may be rotated, a primary driving train for said gear, said primary driving train comprising intermittent locking gears, and a secondary driving train connected with said first mentioned gear, said secondary driving train comprising a spring energized during the period when the driven element is locked against movement.

20. The combination with a housing, of an axially shiftable rotatable member mounted in said housing, a flexible annular boot arranged over the end of said housing and associated with the reciprocable rotative member, said boot being secured at one edge to one of said parts and relatively rotatably associated with the other of said parts.

21. The combination with a housing, of an axially shiftable rotatable member mounted in said housing, an annular flexible boot secured to the end of said housing, a flange carried at the inner end of said boot, and a covering flange carried by the rotative member and associated with the first mentioned flange.

22. The combination with an annular tool holder provided with a plurality of seats, of a plurality of tools mounted in said seats, a rotatable member associated with the tool holder and engaging the tools to shift them in their seats, a segment engaging said member, a cam engaging said segment, a spring holding said segment in contact with the cam, a movable fulcrum for said segment, and means for intermittently shifting said fulcrum.

23. The combination with an annular tool holder provided with a plurality of seats, of a plurality of tools mounted in said seats, a rotatable member associated with the tool holder and engaging the tools to shift them in their seats, a segment engaging said member, a cam engaging said segment, a spring holding said segment in contact with the cam, a movable fulcrum for said segment, a carrier for said movable fulcrum, an actuator for said carrier, and a spring holding said carrier in engagement with its actuator.

In witness whereof, I, GEORGE R. STEVENSON have hereunto set my hand at Indianapolis, Indiana, this twenty-eighth day of April, A. D. one thousand nine hundred and twenty-one.

GEORGE R. STEVENSON.